United States Patent [19]
Ha et al.

[11] Patent Number: 6,035,349
[45] Date of Patent: Mar. 7, 2000

[54] STRUCTURE OF PORTABLE MULTIMEDIA DATA INPUT/OUTPUT PROCESSOR AND METHOD FOR DRIVING THE SAME

[75] Inventors: Jeong Hyeon Ha; Dong Won Han; Jeun Woo Lee, all of Daejon-Shi, Rep. of Korea

[73] Assignee: Electrolnics and Telecommunications Research Institute, Daejon, Rep. of Korea

[21] Appl. No.: 08/987,832

[22] Filed: Dec. 9, 1997

[30] Foreign Application Priority Data

Dec. 9, 1996 [KR] Rep. of Korea ................... 96-63147

[51] Int. Cl.⁷ .................................................. G06F 13/00
[52] U.S. Cl. ................................. 710/68; 710/1; 710/20; 710/66; 709/247
[58] Field of Search .................................. 710/1, 20, 65, 710/66, 68; 341/50; 345/202; 709/247

[56] References Cited

U.S. PATENT DOCUMENTS

| 5,402,499 | 3/1995 | Robison et al. ................... 381/119 |
| 5,434,913 | 7/1995 | Tung et al. ........................ 379/202 |
| 5,440,336 | 8/1995 | Buhro et al. ....................... 348/13 |
| 5,563,649 | 10/1996 | Gould et al. ...................... 348/17 |
| 5,642,139 | 6/1997 | Eglit et al. ........................ 345/202 |
| 5,724,070 | 3/1998 | Denninghoff et al. ............ 345/202 |
| 5,781,788 | 7/1998 | Woo et al. ......................... 712/1 |
| 5,838,927 | 11/1998 | Gillon et al. ..................... 709/247 |
| 5,889,480 | 3/1999 | Kim ..................................... 341/50 |

*Primary Examiner*—Ayaz R. Sheikh
*Assistant Examiner*—Ario Etienne
*Attorney, Agent, or Firm*—Jacobson, Price, Holman & Stern PLLC

[57] ABSTRACT

Potable multimedia terminal which is small and consumes low power, can process a large quantity of multimedia data such as video and audio data. Portable multimedia data input/output processor can be made smaller by using a pen as an input device and can also process a large quantity of multimedia data at a high speed by adopting a PCI bus as a local bus of a system. To retrieve, compress, and decompress multimedia data, main components of this portable multimedia data input/output processor are comprised of audio codec for compressing and decompressing audio data, video codec controller for compressing and decompressing video data, and multimedia processor for transmitting audio data to wireless communication controller and video data to video codec controller and to graphic processor. The method for retrieving multimedia data includes steps of receiving data, de-interleaving received data into audio, video, and graphic data, decompressing the data, and outputting the data to output device. The method for compressing data includes steps of inputting video data to video codec controller, compressing video and audio data at video codec controller and audio codec, interleaving the compressed data, and transmitting them to a remote system. The steps to decompress data are in reverse to the steps to compress data.

5 Claims, 4 Drawing Sheets

STRUCTURE OF PORTABLE MULTIMEDIA DATA INPUT/OUTPUT PROCESSOR AND METHOD FOR DRIVING THE SAME

BACKGROUND OF THE INVENTION

1. Field of the Invention

The present invention relates to a multimedia data processor. In particular, the present invention relates to a structure of a portable multimedia data input/output processor and method for driving the same, which can be miniaturized by using a pen as a data input device and also using a low power device.

2. Description of the Prior Art

A conventional multimedia processing apparatus is usually used for a desk top system because it has problems that not only it makes it difficulty to synchronize between multimedia data since it uses a high performance dedicated hardware for individually processing multimedia data for video and audio, and graphics respectively but also the size of the apparatus becomes bigger by use of an individual hardware. In addition, a bad quality of voice and image makes the user inconvenient to use them since the conventional multimedia processing apparatus currently adopts a high performance main processor in order to process all kinds of multimedia data with a software.

Presently, the portable computer involves a personal information terminal and a note book computer. The personal information terminal among them is easy to carry, but it does not provide a function of accessing and processing multimedia data except for the function of electronic diary, modem and fax etc. And, the note book computer is not suitable to carry in view of its weight and size since it is a miniaturized version of the desk top computer with same functions as the note book computer has.

SUMMARY OF THE INVENTION

It is one object of the present invention to solve the problems involved in the prior art, and to provide a portable multimedia data input/output processor which makes it possible for the user to retrieve and process a desired information or to have a video conferencing meeting with other people using a wireless communication without limitation to his/her location.

It is an another object of the present invention to solve the problems involved in the prior art, and to provide a portable multimedia data input/output processor which makes it possible for the user to input command with a pen without using a keyboard of a conventional input device, and also which can process a large quantity of multimedia data at a high speed by adopting a standard high-speed bus—Peripheral Component Interconnect(hereafter called "PCI") bus—as a local bus of the system.

To achieve the above object, the structure of a portable multimedia data input/output processor according to the present invention is characterized in that it comprises a low power central processing unit, coupled to a system bus, for controlling all the devices and programs to drive them; a pen interface, coupled to said system bus, for processing data from a pen being an input device; a ROM for storing an operating program of the multimedia processor and a booting program initiating the devices; a memory for storing data operating an operating system and an application program; a memory controller, coupled to said system bus, for controlling said ROM and said memory; a PCI bridge for interfacing said system bus which is connected to said central processing unit, said pen interface and said memory controller and a PCI bus which is connected to said multimedia device; an audio codec, coupled to said multimedia processor, for converting analog audio data inputted from a microphone into digital audio data or digital audio data inputted from said multimedia processor into analog audio data and compressing or decompressing digital audio data; a video decoder, coupled to said multimedia processor, for converting analog video data inputted from cameras into digital video data; a multimedia processor, coupled to said PCI bus, for transmitting the audio data inputted from said audio codec to wireless communication controller and the video data inputted from said video decoder to said video codec controller and a graphic processor; a graphic processor, coupled to said PCI bus, for outputting digital video data and graphic data inputted from said multimedia processor or said video codec controller, respectively, to a liquid crystal display; a frame buffer, coupled to said graphic processor, for storing graphic data and video data which are outputted from said graphic processor to said liquid crystal display; a video codec controller, coupled to said PCI bus, for compressing video data inputted from said multimedia processor or restoring remote video data inputted from a wireless communication controller; and a wireless communication controller, coupled to said PCI bus, for communicating with a remote system.

To achieve the above object, the method of driving a portable multimedia data input/output processor according to the present invention is characterized in that it comprises the steps of retrieving a multimedia information in response to a information retrieval command from a remote system; inputting and compressing video and audio signals so as to transmit the resulting signals to said remote system; and decompressing said compressed data from said remote system to output the resulting signals to an output device.

BRIEF DESCRIPTION OF THE DRAWINGS

For fuller understanding of the nature and object of the invention, reference should be had to the following detailed description taken in conjunction with the accompanying drawings in which.

The above object, and other features and advantages of the present invention will become more apparent by describing the preferred embodiment thereof with reference to the accompanying drawings, in which.

Similar reference characters refer to similar parts in the several views of the drawings.

DETAILED DESCRIPTION OF PREFERRED EMBODIMENT

Figure 1:
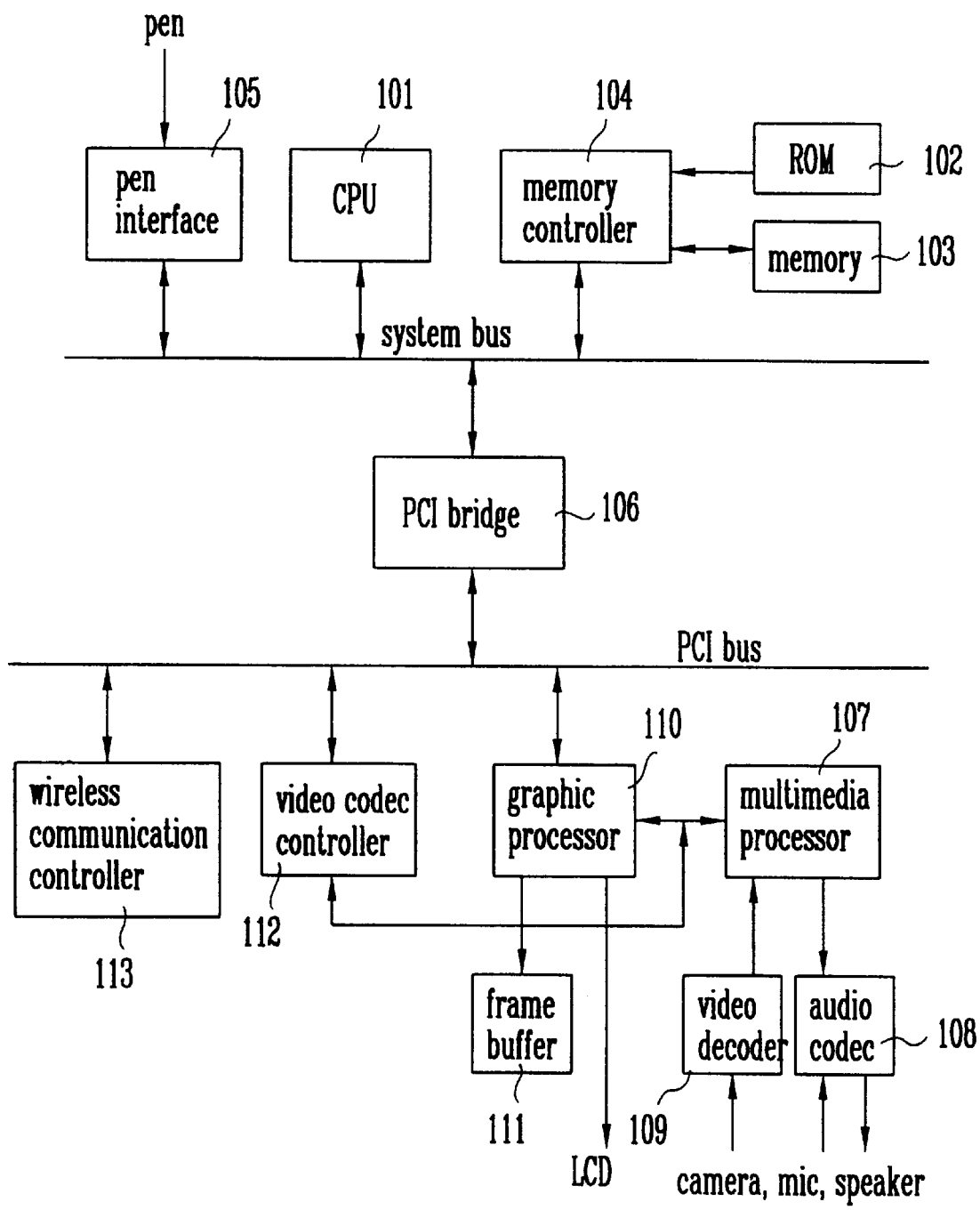
FIG. 1 is a block diagram illustrating a structure of a portable multimedia data input/output processor according to the preferred embodiment of the present invention.

First, referring to FIG. 1, there is shown a block diagram illustrating a structure of a portable multimedia data input/output processor according to the preferred embodiment of the present invention, each element of which will be explained as follows.

A low power central processing unit(CPU) 101 for controlling/driving all the devices and programs is coupled to a system bus. A memory controller 104 is coupled to the system bus, the controller 104 for controlling a ROM 102 storing an operating program of the multimedia processor 107 and a booting program initiating the devices; and a memory 103 of a RAM storing data and in which an operating system and an application program are actually operating. As illustrated in the drawing, a pen interface 105 for processing data from the pen replacing the key board, being an input device, is coupled to the system bus. A standard PCI bus for insuring a high speed data processing is adopted as a local bus for connecting the multimedia devices used to transmit multimedia data at high speed, thus forming a PCI bridge 106 for an interface between the PCI bus and the system bus. A multimedia processor 107, for transmitting the audio data inputted from audio codec 108 to wireless communication controller 113 and the video data inputted from video decoder 109 to video codec controller 112 and a graphic controller 110 is coupled to the PCI bus. An audio codec 108, for converting analog audio data inputted from a microphone into digital audio data or digital audio data inputted from the multimedia processor 107 into analog audio data and compressing digital audio data and decompressing compressed audio data inputted from the wireless communication controller 113, is coupled to the multimedia processor 107, and a video decoder 109 for converting analog video data inputted from cameras into digital video data is coupled to the multimedia processor 107. A graphic processor 110 for outputting graphic data and digital video data inputted from the multimedia processor 107 or the video codec controller 112 to a liquid crystal display (hereafter called LCD) is coupled to the PCI bus, and a frame buffer 111 for storing graphic data and video data both outputted from the graphic processor 110 to the LCD is coupled to the graphics processor 110. A video codec controller 112, for decompressing remote video data inputted from the wireless communication controller 113 or compressing video data inputted from the multimedia processor 107, is coupled to the PCI bus. The wireless communication controller 113 communicating with the remote system is coupled to the PCI bus.

Figure 2:
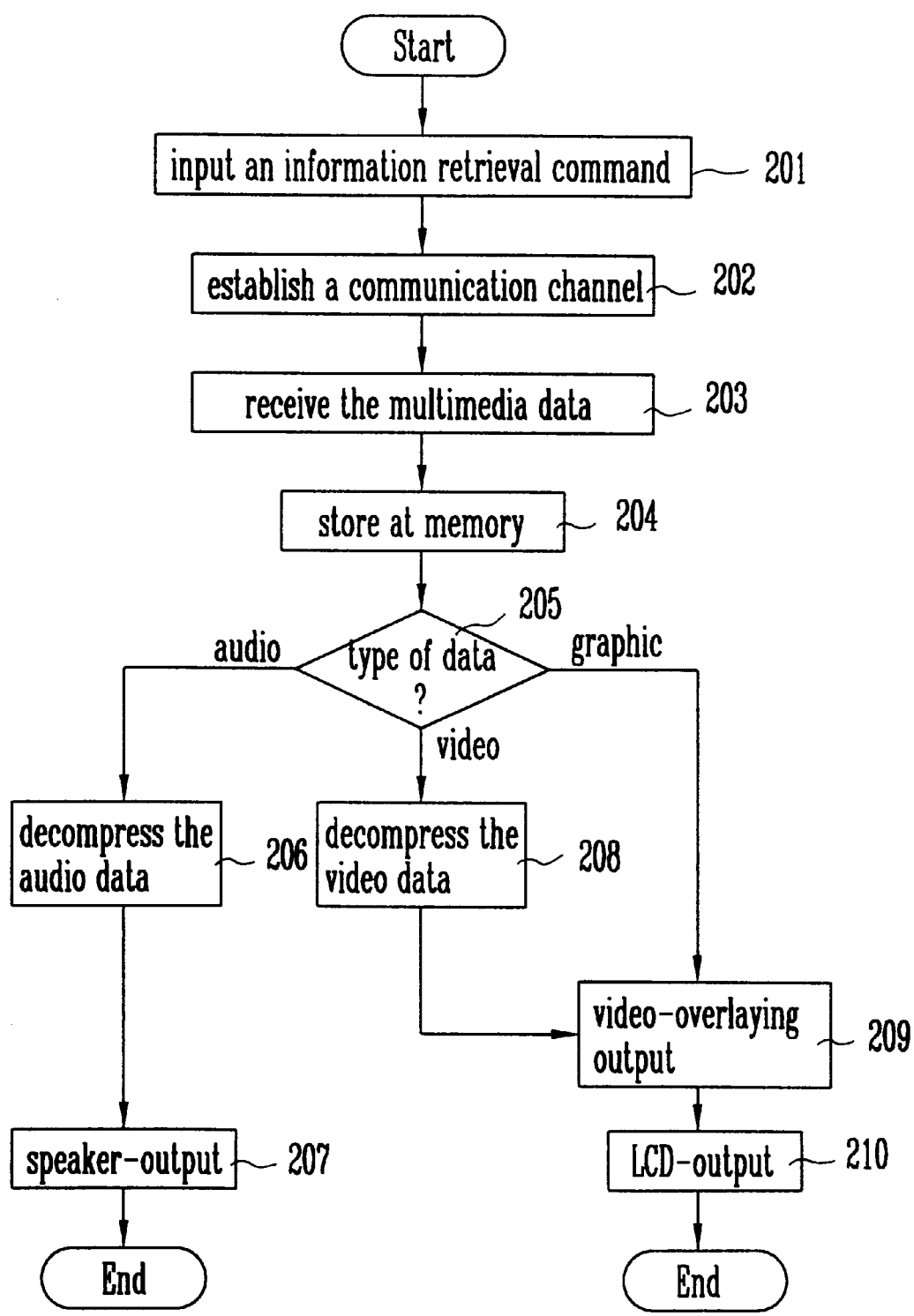
FIG. 2 is a flowchart illustrating information retrieval of a portable multimedia data input/output processor according to the preferred embodiment of the present invention.

Referring to FIG. 2, there is shown a flowchart illustrating information retrieval of a portable multimedia data input/output processor according to the preferred embodiment of the present invention. As illustrated in the drawing, when an information retrieval command for a specific remote system is inputted with a pen (step 201), a communication channel for connecting to the system is established, and then data to be retrieved are selected therefrom. Next, multimedia data to be retrieved are received therefrom (step 203). Since the multimedia data are large in quantity, they are transmitted at a compressed format order to reduce communication load. The received data are stored at a RAM of a main memory (step 204). These multimedia data are de-interleaved individually into video or audio data by an application program since audio and video data are interleaved together therewith. Thus de-interleaved data are transmitted to the multimedia processor so as to confirm a type of data (step 205). As the results of the confirmation, if they are audio data, the data are transmitted to the audio codec. The audio codec decompresses the audio data into digital audio data, converts them into analog audio data (step 206), and then outputs them to a speaker (step 207). As the results of the confirmation, if they are video data, the data are transmitted to the video codec controller and then decompressed into digital video data (step 208). After the decompressed video data are once stored at the frame buffer, they are overlayed with existing graphics data in the graphics processor to be outputted to the LCD being an output device step (210). As the results of the confirmation, if they are graphic data, the steps 209 and 210 are executed.

Figure 3:
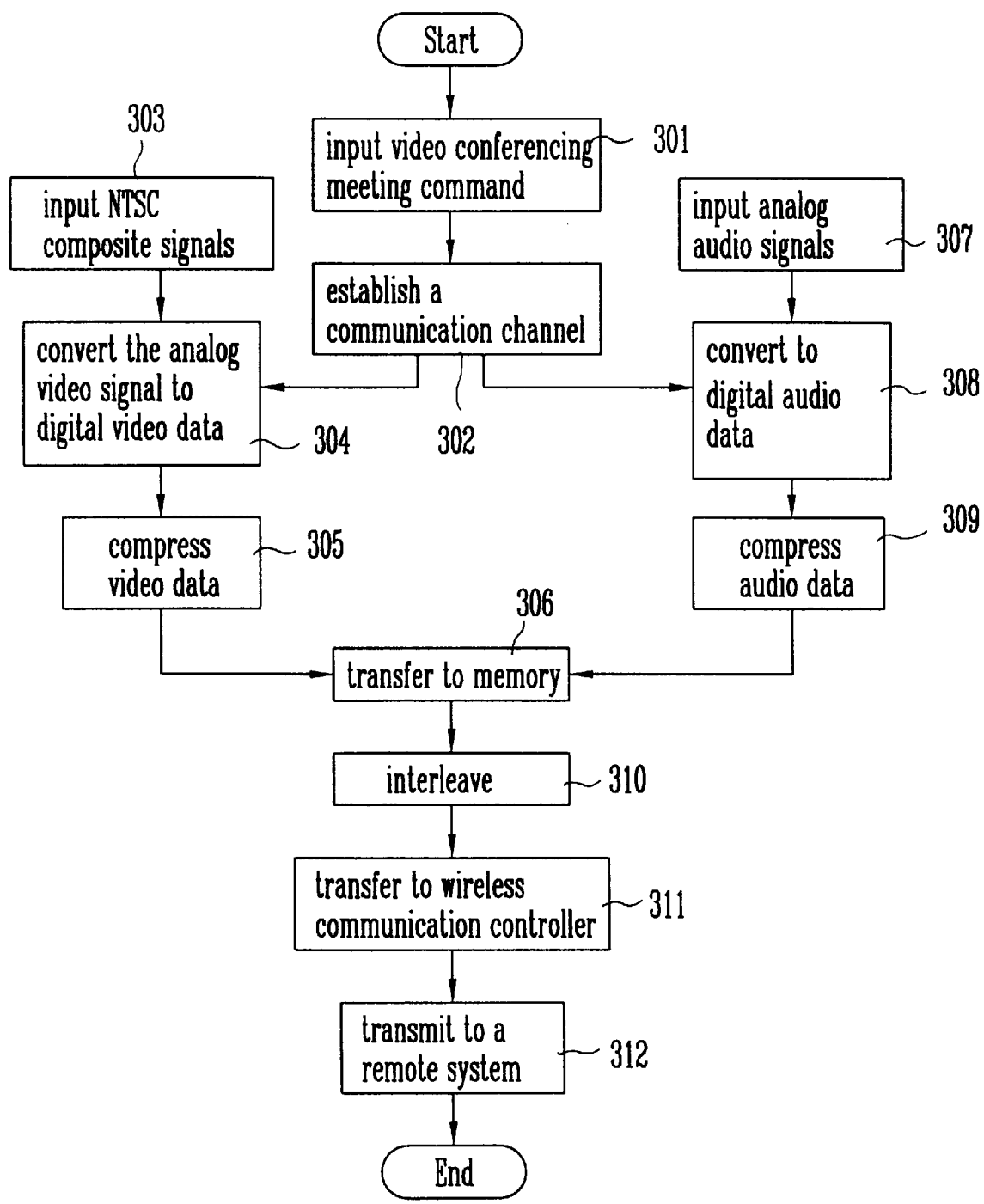
FIG. 3 is a flowchart illustrating data compression of a portable multimedia data input/output processor according to the preferred embodiment of the present invention.
Figure 4:
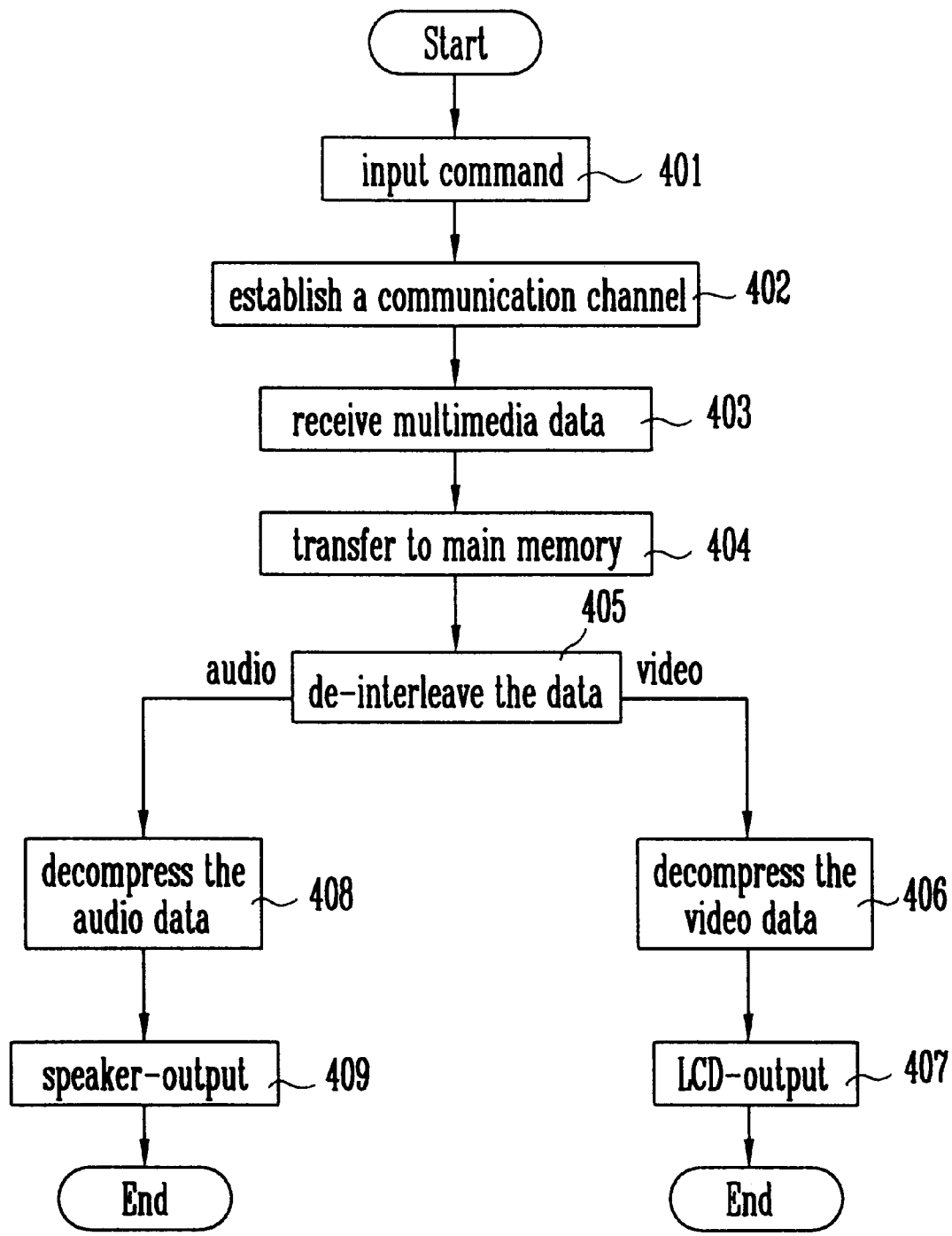
FIG. 4 is a flowchart illustrating data decompression of a portable multimedia data input/output processor according to the preferred embodiment of the present invention.

Next, turing now to FIG. 3, there is shown a flowchart illustrating data compression of a portable multimedia data input/output processor according to the preferred embodiment of the present invention. A command for initiating a video conferencing meeting with a specific remote system is inputted by means of pen (step 301). When the command has been inputted, a communication channel for connection to the system is first established (step 302). When NTSC (national television system committee) composite signals are inputted to a video device from a camera that is a video input device (step 303), the analog video signals are converted into digital video data at the video decoder (step 304), which are then inputted into the video codec controller for performing a video compression. The video codec controller compresses the digital video data at a low transfer rate (step 305) and then transfers the compressed video data to the RAM of a main memory via the high-speed local PCI bus (step 306). When analog signals are inputted to an audio device from a microphone that is an audio input device (step 307), they are converted into digital audio data at the audio codec (step 308) and then compressed to a low transfer rate (step 309) so as to be transmitted to the multimedia processor. Thereafter, the multimedia processor transfers the compressed audio data to the RAM of a main memory via the PCI local bus (step 306), interleaves the compressed video data and the compressed audio data together (step 310), and then transmits them to the wireless communication controller via the PCI local bus (step 311). The wireless communication controller transmits the compressed multimedia data to a remote system with which a video conferencing meeting is to be held (step 312). During the compression operation, local video data are directly transmitted to the graphic processor so that they are outputted to the LCD being an output device. The transmitted multimedia data are decompressed and then outputted to the output device of the system as shown In FIG. 4. These compression and decompression processes may be performed at the same time, or the decompression process may be followed by the compression process.

Finally, referring FIG. 4, there is a flowchart illustrating data restore of a portable multimedia data input/output processor according to the preferred embodiment of the present invention. When a command is inputted (step 401), a communication channel for connecting to a remote system is established (step 402). After the communication channel is established, the data to be decompressed are received at the wireless communication controller (step 403). The multimedia data received at the wireless communication controller are transmitted to the RAM of a main memory via the PCI bus (step 404). These multimedia data received at the main memory are de-interleaved into video and audio data (step 405). Next, the compressed video data are transmitted to the video codec controller so that they can be then decompressed (step 406). The decompressed video data are outputted via the graphic processor to the LCD (step 407). At this time, the audio data are transmitted to the audio codec after they are sensed as audio data at the multimedia processor, and then decompressed (step 408). The digital audio data are converted into analog data and then outputted to a speaker of an output device (step 409).

As described above, the present invention provides the advantages in that it can be applied in the field of multimedia data processing such as a portable data input/output device, remote education and remote diagnostics etc. since it makes it possible to access data without limitation to its location and also to have a video conferencing meeting with a remote system.

While the present invention has been described and illustrated herein with reference to the preferred embodiment thereof, it will be understood by those skilled in the art that various changes in form and details may be made therein without departing from the spirit and scope of the invention.

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations that may be made within the scope and spirit of the present invention are to be encompased as further embodiments of the present invention.

What is claimed is:

1. A method for driving a portable multimedia data input/output processor, comprising steps of:

retrieving multimedia information in response to an information retrieval command from a remote system, wherein the retrieving step comprises steps of:

entering an information retrieval command of said remote system, establishing a communication channel and selecting data to be retrieved;

receiving data to be retrieved;

storing the received data into a main memory;

de-interleaving the data stored at the main memory into de-interleaved data by an application program;

transmitting the de-interleaved data to a multimedia processor so as to confirm a type of data;

if the type of data is audio data, transmitting the audio data to an audio codec;

after the audio data are decompressed into digital audio data at the audio codec, converting the decompressed digital audio data into analog audio data thereby to output the analog audio data to an output device;

if the type of data is video data, transmitting the video data to a video codec controller, decompressing the video data into digital video data and then storing the decompressed video data into a frame buffer;

overlaying the digital video data stored at the frame buffer with existing graphic data at a graphic processor thereby to output the resulting data to an output device; and if the type of data is graphic data, overlaying the graphic data at a graphic processor thereby to output the graphic data to the output device;

inputting and compressing video and audio signals to transmit the compressed video and audio signals to said remote system; and decompressing said compressed video and audio signals from said remote system to output the decompressed signals to the output device.

2. A method for driving a portable multimedia data input/output processor in claim 1, wherein said retrieving step and said inputting and compressing step are simultaneously performed.

3. A method for driving a portable multimedia data input/output processor as claimed in claim 1, wherein said inputting and compressing step comprises steps of:

inputting a command for initiating a video conferencing meeting with a specific remote system and then establishing a communication channel;

inputting NTSC composite signals from a video input device and then converting analog video signals into digital video data at a video decoder;

inputting said digital video data at a video code controller;

compressing said digital video data received at said video codec controller and then transmitting the compressed data to a memory via a PCI bus;

if analog audio data is inputted from an audio input device, converting the analog audio data into digital audio data at an audio codec, compressing and transmitting the digital audio data to a multimedia processor;

transferring the compressed audio data received at said multimedia processor to a memory via the PCI bus;

interleaving the compressed video data and the compressed audio data and then transmitting the interleaved data to a wireless communication controller via the PCI bus; and transmitting said interleaved video and audio data received at said wireless communication controller to a remote system with which the video conferencing meeting is to be held.

4. A method for driving a portable multimedia data input/output processor as claimed in claim 1, wherein said decompressing step further comprises steps of:

inputting a command, establishing a communication channel, and then receiving the compressed multimedia data to be decompressed at a wireless communication controller;

transmitting the compressed multimedia data received at the wireless communication controller to a memory via a PCI bus;

de-interleaving the compressed multimedia data received at the memory so as to separate video and audio data;

transmitting the de-interleaved video data to a video codec controller and then decompressing them;

outputting the decompressed video data to an output device via a graphic processor; and transmitting the de-interleaved audio data to an audio codec at a multimedia processor, decompressing the de-interleaved audio data, and then converting the decompressed audio data into an analog audio data so as to output the analog audio data to an output device.

5. A structure of a portable multimedia data input/output processor, comprising:

a low power central processing unit, coupled to a system bus, for controlling a plurality of devices and programs to drive the plurality of devices;

a pen interface, coupled to said system bus, for processing data from a pen being an input device;

a ROM for storing an operating program of the portable multimedia data input/output processor and a booting program for initiating the plurality of devices;

a memory for storing data operating an operating system and an application program;

a memory controller, coupled to said system bus, for controlling said ROM and said memory;

a PCI bridge for interfacing said system bus which is connected to said central processing unit, said pen interface and said memory controller and a PCI bus;

a wireless communication controller, coupled to said PCI bus, for communicating with a remote system;

a multimedia processor, coupled to said PCI bus, for transmitting the audio data inputted from an audio codec to said wireless communication controller and the video data inputted from a video decoder to a video codec controller and a graphic processor;

said audio codec, coupled to said multimedia processor, for converting analog audio data inputted from a microphone into digital audio data or digital audio data inputted from said multimedia processor into analog audio data and compressing digital audio data and decompressing compressed audio data inputted from said wireless communication controller;

said video decoder, coupled to said multimedia processor, for converting analog video data inputted from cameras into digital video data;

said video codec controller, coupled to said PCI bus, for compressing video data inputted from said multimedia processor or decompressing remote video data inputted from said wireless communication controller;

a graphic processor, coupled to said PCI bus, for outputting digital video data and graphic data inputted from said multimedia processor or said video codec controller, respectively, to a liquid crystal display; and a frame buffer, coupled to said graphic processor, for storing graphic data and video data which are outputted from said graphic processor to said liquid crystal display.

* * * * *